United States Patent
Lin (12)

(10) Patent No.: US 8,171,604 B2
(45) Date of Patent: May 8, 2012

(54) STRUCTURE OF STEEL CABLE FASTENER

(76) Inventor: Ruei-Hsing Lin, Taipei Hsien (TW)

( * ) Notice: Subject to any disclaimer, the term of this patent is extended or adjusted under 35 U.S.C. 154(b) by 333 days.

(21) Appl. No.: 12/554,996

(22) Filed: Sep. 8, 2009

(65) Prior Publication Data

US 2011/0056057 A1    Mar. 10, 2011

(51) Int. Cl.
*G09F 5/00* (2006.01)
(52) U.S. Cl. .................................. 24/68 R; 248/317
(58) Field of Classification Search .............. 24/68 R; 52/39; 248/317, 342, 343, 327, 328; 40/606.11, 40/617; 267/71
See application file for complete search history.

(56) References Cited

U.S. PATENT DOCUMENTS 3,990,665 A * 11/1976 Joussemet .................... 248/243

FOREIGN PATENT DOCUMENTS

| JP | 08093167 A | * | 4/1996 |
| JP | 10038034 A | * | 2/1998 |
| WO | WO 2008050353 A2 | * | 5/2008 |

* cited by examiner

*Primary Examiner* — James Brittain

(57) ABSTRACT

A structure of steel cable fastener is provided for eliminating a returning force caused by twisting stress induced in a steel cable when the steel cable is stretched and fixed by the fastener, which induces a stress due to fixing of a fixing end of the steel cable. Such a returning force makes the operation and adjustment of mounting a locking cap to the steel cable difficult and also induces damage and wear of a fixing end of the steel cable due to twisting stress induced in the steel cable. The structure of the steel cable fastener includes a bearing retainer that carries a bearing device and arranged inside the locking cap to secure an end of the steel cable and a resilient element arranged between the bearing retainer and the locking cap for relief of twisting stress induced in the steel cable through the rotation of the bearing device.

3 Claims, 5 Drawing Sheets

STRUCTURE OF STEEL CABLE FASTENER

TECHNICAL FIELD OF THE INVENTION

The present invention generally relates to a structure of steel cable of which the design purpose is to provide a novel steel cable fastener that is of high functionality and high safety. The whole structure is composed of a locking cap, a resilient element, a bearing retainer, and a fixing seat to exhibit a two-sectioned configuration, of which the first section provides the function of fixing and the second section provides the function of locking and adjusting. The fixing function of the first section is realized by mounting the fixing seat to a base fixture surface through a fastener and then the bearing retainer receives and secures an end of the steel cable that extends through the locking cap and the resilient element, so that the bearing retainer may serve as a fixing end and force carrying end of the steel cable. Finally, the locking cap is coupled to the fixing seat through an operation of threading engagement to realize the locking and adjusting function of the second section.

The locking and adjusting function is a function provided by a combination of the locking cap, the resilient element, and the bearing retainer, including fine adjustment of the length of the steel cable, adjustment of the stretching stress of the steel cable, relief of the returning force induced by the twisting stress, and relief of the stretching stress of the steel cable. These advantages will be individually described as follows:

The fine adjustment of the length of the steel cable is realized by adjusting the locking depth between the fixing seat and the locking cap. In brief, when the locking depth is great, the fine adjustment of the steel cable length is made significant; and when the locking depth is shallow, the fine adjustment of the steel cable is made minor. With this function, the arrangement of the steel cable length can be made in a more adaptive manner to facilitate the performance of the installation operation.

The adjustment of stretching stress of steel cable is realized through adjustment of locking depth among the fixing seat, the locking cap, and the resilient element. In brief, a great locking depth induces a great load on the resilient element and a great stretching stress on the steel cable. On the other hand, a small locking depth corresponds to a small load on the resilient element and thus a small stretching stress on the steel cable. With this mechanism, the steel cable can be adjusted to the optimum stress condition both before and after installation operation to match the load subsequently applied thereto by peripheral parts, so as to facilitate installation and adjustment done by an operator.

Relief of a returning force induced on the steel cable due to twisting stress thereof is realized by the rotation of the bearing retainer caused by the rotation of the locking cap in accordance with the stress relationship among the bearing retainer, the resilient element, and the steel cable, whereby when the steel cable is set in a fixed condition, the steel cable does not rotate with the rotation of tightening operation of the locking cap so as to relieve the twisting stress induced in the steel cable. This performance is realized by using the bearing retainer as both a fixing end and a force carrying end of the steel cable and confining the bearing retainer within the locking cap with the resilient element therebetween being supported by an inner top face of the locking cap and the bearing retainer, while the an upper portion of the bearing retainer supports a bearing device that provides the function of rotation, whereby under the condition that compression is induced on the resilient element and rotation is forced on the locking cap, the bearing device of the bearing retainer is caused to rotate to relieve the twisting stress induced in the steel cable and alleviate any damage and wear caused by the twisting. As such, the adjustment of the locking operation and the coupling operation can be made effort-saved and effective and safety concerns caused by positional shift of the locking cap due to the twisting stress are confirmatively eliminated.

Relief of the twisting stress of the steel cable can be realized through the spatial relationship among the resilient element, the bearing retainer, and the steel cable, wherein the bearing retainer serves as both a fixing end and a force carrying end of the steel cable. With the resilient element staying in an effective resiliency condition, the steel cable is provided with an effective length of stretching, which is subjected to constrain set by the resiliency of the resilient element. Thus, when the steel cable is subjected to stretching or an external impact, this effective stretching length allow for variation of the length of the steel cable to effectively relieve the stretching stress induced therein, so as to offer the function of protection of article suspended by the steel cable.

DESCRIPTION OF THE PRIOR ART

Exhibition of articles by suspending the articles is commonly seen in for example business offices, shops, galleries, malls, shopping centers, public places, stations, or even government organizations. Besides being considered a primary item by the industries of advertisement, exhibition, and decoration, it now becomes a main stream in these industries and has been very appealing to the general consumers.

In view of this factor, in order to suit the need of wide applications in suspension function or suspension structure, various hardware parts have been developed for use in the suspension function and suspension structure. Although these hardware parts are well improved in respect of fineness and aesthetics, yet these hardware parts may not completely meet the needs in four factors including convenient assembling, loading force carried by the structure, durability, and safety.

The conventional steel cable based suspension function and suspension structure are provided with fixing points or force carrying points that are realized by knotting, tying or fitting. This shows problems in safety, causing general concerns regarding the safety of use. The present invention provides a major improvement on a hardware fastener and also provides an effective solution for the arrangement of steel cable to thereby make a revolutionary advance in this field.

Further, regarding the steel cable that is the most important element of a suspension structure, the conventional way of mounting the steel cable is to provide a fixing buckle at a fixing end of the steel cable. The fixing buckle functions as fixing end of the steel cable and also serves as a force carrying end, which carries the stretching load and twisting force applied to the steel cable. Thus, the fixing buckle is the most concerned element where damages and break caused by twisting or detachment and deformation may occur.

SUMMARY OF THE INVENTION

The present invention provides a structure of a steel cable fastener to fix a steel cable that suspends articles. The present invention provides a novel arrangement of the steel cable by providing a fastener that offers new functionality and improved safety, whereby the whole structure of suspending articles with the steel cable may meet the needs of four concerns of convenient assembling, loading carried by the structure, durability, and safety.

The structure of the present invention is comprised of a locking cap, a resilient element, a bearing retainer, and a fixing seat. The locking cap, the resilient element, and the bearing retainer constitute a second section that offers a function of locking and adjusting. The locking and adjusting function section is coupled to a first section that offers a function of fixing with threading engagement to thereby provide a two-section threading-engaging, adjustable, and conveniently assembled fastener having high strength and adjustability.

Especially, the bearing retainer comprises an axle of an upper portion thereof to provide an effect of allowing for rotation even being acted up by a forced induced by a resilient element so as to eliminate the rotary force that is required for threadingly coupling the locking cap and the fixing seat. Thus, to serve as both a fixing end a force carrying end, the locking cap and the fixing seat are coupled through threading engagement, and at the same time, a bearing device of the bearing retainer is rotated in synchronous manner to thereby release the twisting force induced by the rotation of the locking cap and thus eliminate springing-back and returning occurring in the locking cap. This makes the assembling efficient, effective, and safe, and also eliminates damage of the steel cable due to the twisting force and severe wear induced in the fixing end of the steel cable.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
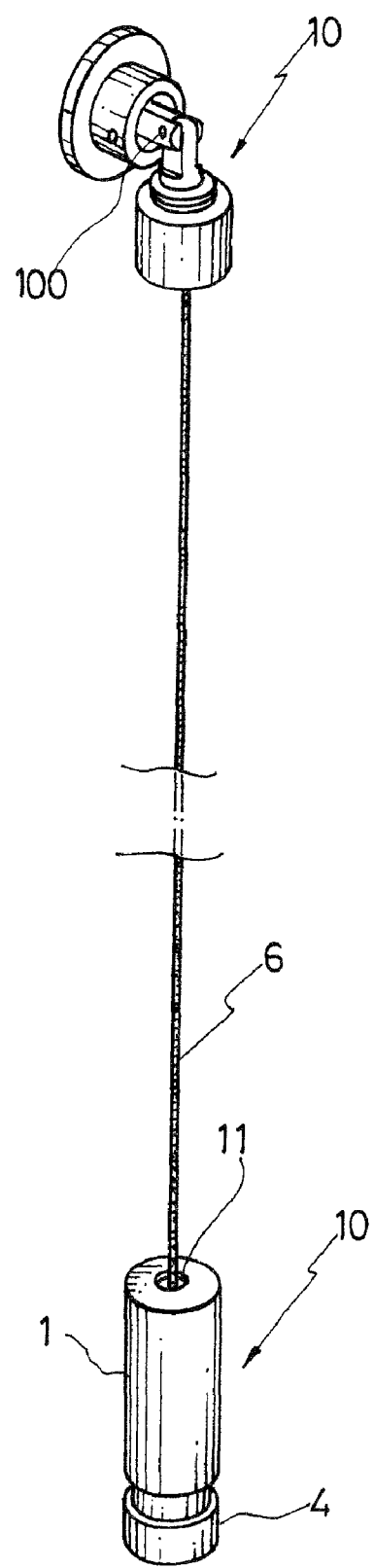
FIG. 1 is a perspective view showing a preferred embodiment of the present invention in a completely assembled form.
Figure 6:
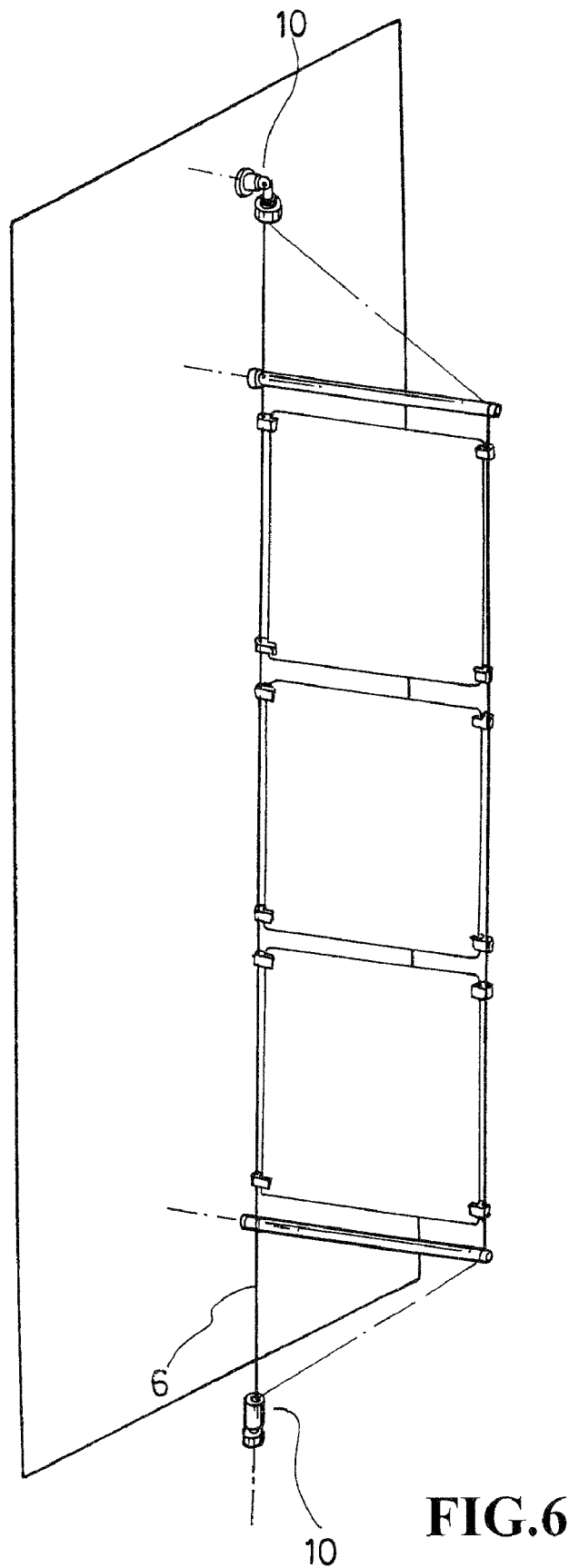
FIG. 6 is a perspective view showing an application of the present invention in a steel cable suspension structure.

Referring to FIG. 1, the present invention provides a fastener, generally designated at 10, to be mounted at opposite ends of a steel cable 6 for fixing the ends of the steel cable. Variation may be made in the configuration of the fastener 10 to suit different needs and requirements. For example, the fastener 10 can be of such a structure that a fixing seat 4 is modified in the configuration thereof to incorporate a folding structure 100, making the fixing seat 4 a foldable seat, or alternatively, no folding structure is provided, so that the fixing seat 4 is a simple straight barrel. In the embodiment illustrated in FIG. 1, a top end fastener 10 and a lower end fastener 10 are provided to top and lower ends of a steel cable 6 and these two fasteners 10 exhibit the structures discussed above and an application thereof that realizes a steel cable suspension structure as shown in FIG. 6.

Figure 2:
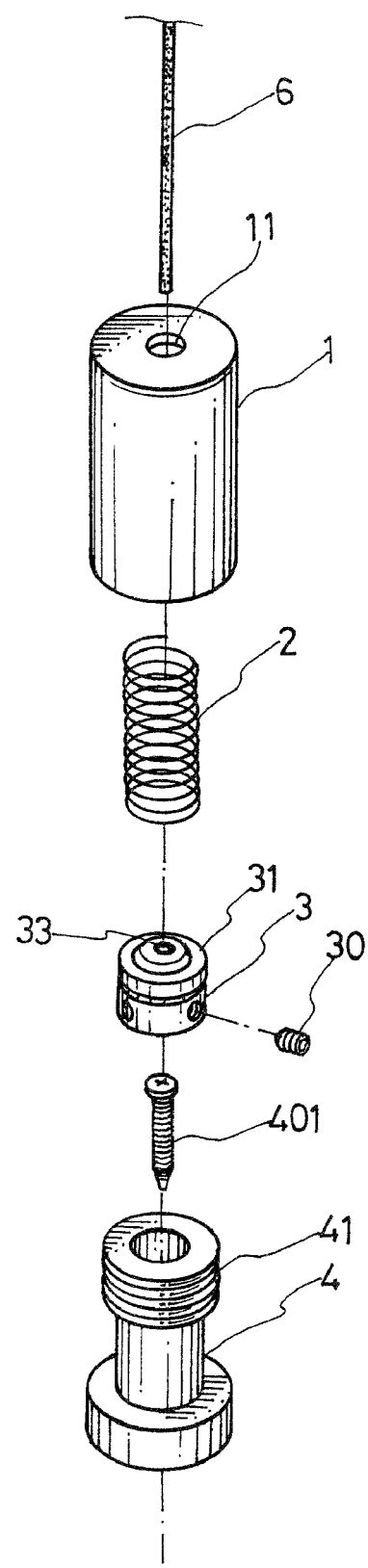
FIG. 2 is an exploded view showing a fastener in accordance with the present invention.
Figure 5:
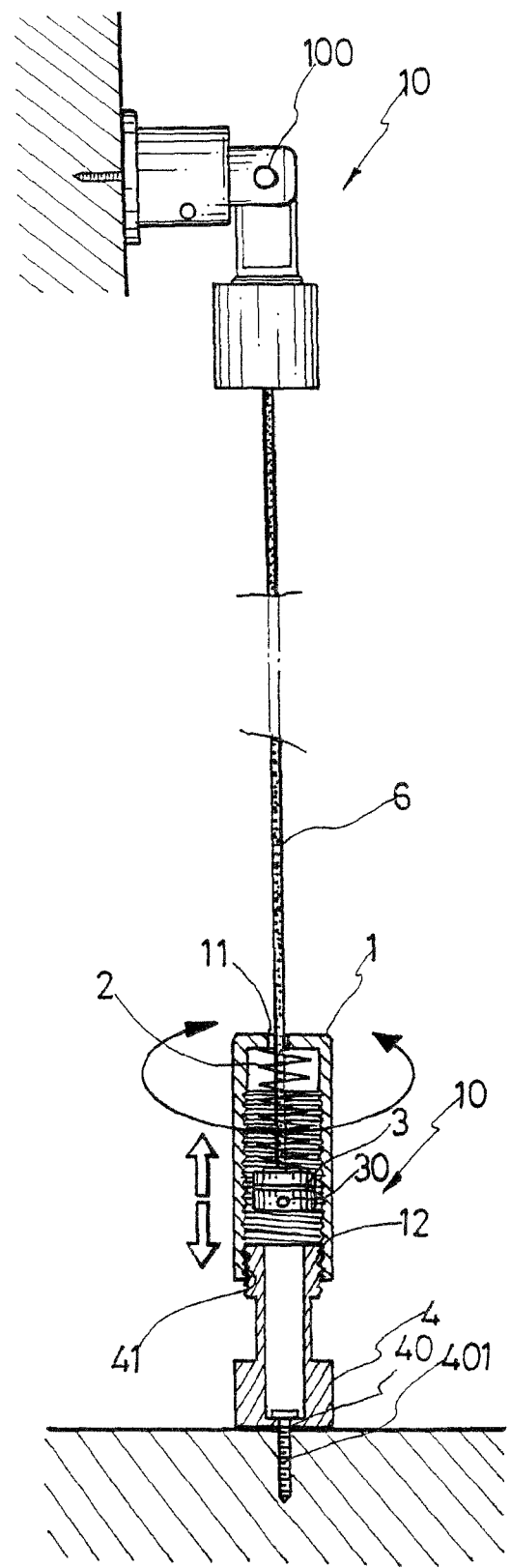
FIG. 5 is a cross-sectional view showing the whole structure of the present invention after the fastener is mounted.

As shown in FIG. 2, the structure of steel cable fastener in accordance with the present invention comprises a locking cap 1, a resilient element 2, a bearing retainer 3, and the fixing seat 4, of which a combination shows a two-section locking configuration. As shown in FIG. 5, the two section locking configuration comprises a first section, which provides a fixing function and is mainly constituted by the fixing seat 4, and a second section, which provides a locking and adjusting function and is mainly constituted by the locking cap 1, the resilient element 2, and the bearing retainer 3. The complete structure of the fastener 10 is provided by coupling the locking cap 1 of the second section to the fixing seat 4 of the first section with threading engagement.

In embodiment and structural arrangement of the present invention, the fixing seat 4 forms a through hole 40 in a bottom thereof and a fastener 401 is received through the hole 40 to secure the fixing seat 4 to an external fixture surface 5. The fixing seat 4 also forms an externally-threaded section 41 for threading engagement with the locking cap 1, whereby the locking and adjusting function of the second section is combined with the fixing seat 4 of the first section to as offers four advantages: fine adjustment of length of steel cable, adjustment of stretching stress of steel cable, relief of returning force induced by twisting stress, and relief of stretching stress of steel cable.

As shown in FIGS. 2 and 5, the locking cap 1 has a closed top end forming a through hole 11 serving as a cable passage and forms a hollow interior space in communication the cable passage 11 and having an inside surface defining an internal thread 12. The through hole 11 receives the extension of an end section of the steel cable 6, which is then secured by the bearing retainer 3 with the resilient element 2 arranged therebetween. The internal thread 12 formed in the inside surface provides threading engagement with the externally-threaded section 41 of the fixing seat 4 to have them coupled together.

Figure 3:
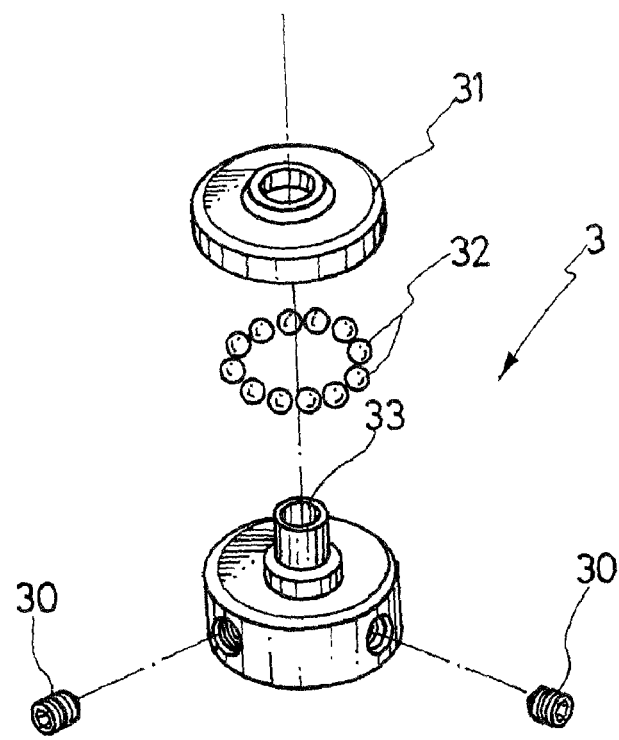
FIG. 3 is an exploded view of a bearing retainer in accordance with the present invention.
Figure 4:
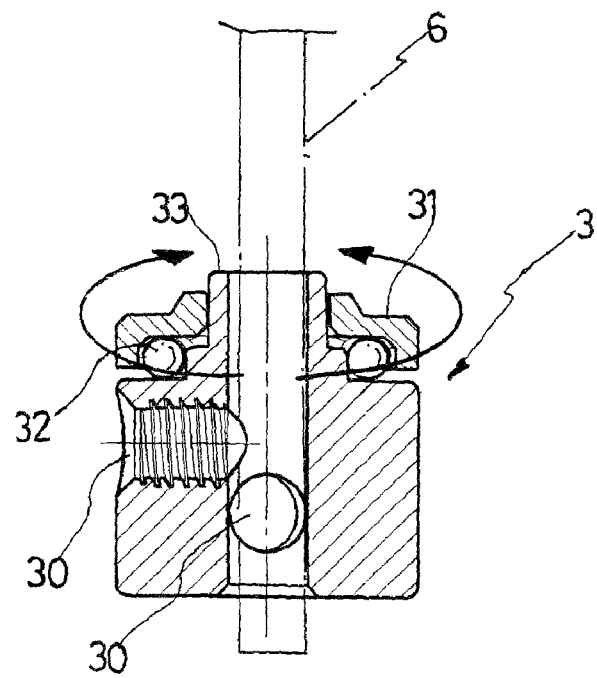
FIG. 4 is a cross-sectional view of bearing retainer in accordance with the present invention.

Referring to FIGS. 3 and 4, the bearing retainer 3 exhibits a function of rotation with a bearing device 31 mounted to an upper portion thereof. The bearing device 31 is structured by concealing rolling balls 32 therein and receiving a central axle 33 to fit therein so as to keep the concealed rolling balls 32 from separating. The end of the steel cable 6 is received a bore defined in the central axle 33 and is secured by one or more sideways arranged fasteners 30 so as not to be interfered with by the rotation of the bearing device 31.

As shown in FIG. 5, the relationship between and the movement induced by the fastener 10 and the steel cable 6 can be adjusted by a rotary locking operation applied to the locking cap 1 to realize fine adjustment of the length of the steel cable 6 and the adjustment of the stretching stress of the steel cable 6. The arrangement of the resilient element 2 provides a relief to the stretching stress loaded to the steel cable 6. Most importantly, the bearing retainer 3 allows for relief of twisting stress and damage and wear due to twisting of the steel cable induced by the stretching stress. Thus, adjustment of locking operation and mounting of the locking cap 1 are made effort-saved and reliable. Further, concerns regarding safety and installation caused by positioning shift of the locking cap 1 due to twisting stress are eliminated.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A steel cable fastener, comprising: a locking cap, a resilient element, a bearing retainer, and a fixing seat and characterized in that:

the locking cap has a closed top end forming a cable passage for the extension of an end section of a steel cable and forms a hollow interior space in communication the cable passage and having an inside surface defining an internal thread for threading engagement with an externally-threaded section of the fixing seat to couple together;

the resilient element is arranged between the bearing retainer and the locking cap and encompasses the steel cable to be acted upon by stretching stress of the steel cable as being deformed;

the bearing retainer has an upper end carrying a bearing device that comprises concealed rolling balls and the bearing retainer has a central axle that is fit into and supports the bearing device, the central axle forming a bore in which the end of the steel cable is received and is secured by a sideways fastener; and the fixing seat forms a hole in a bottom thereof that receives a fastener adapted to secure the fixing seat to an external fixture surface and also forms the externally-threaded section for threading engagement with the locking cap.

2. The steel cable fastener according to claim 1, wherein the fixing seat comprises a foldable structure that allows for folding of the fixing seat.

3. The steel cable fastener according to claim 1, wherein the bearing retainer comprises more than one sideways fastener for securing the steel cable.

* * * * *